(12) United States Patent
Park et al.

(10) Patent No.: US 11,131,770 B2
(45) Date of Patent: Sep. 28, 2021

(54) VEHICLE RADAR

(71) Applicant: MANDO CORPORATION, Gyeonggi-do (KR)

(72) Inventors: Moon Hee Park, Gyeonggi-do (KR); Sang-Min Kim, Gyeonggi-do (KR)

(73) Assignee: MANDO CORPORATION, Gyeonggi-Do (KR)

(*) Notice: Subject to any disclaimer, the term of this patent is extended or adjusted under 35 U.S.C. 154(b) by 350 days.

(21) Appl. No.: 16/244,026

(22) Filed: Jan. 9, 2019

(65) Prior Publication Data

US 2020/0025913 A1 Jan. 23, 2020

(30) Foreign Application Priority Data

Jan. 10, 2018 (KR) .................. 10-2018-0003175

(51) Int. Cl.
| | | |
|---|---|---|
| *G01S 13/931* | (2020.01) | |
| *G01S 7/40* | (2006.01) | |
| *B60R 11/00* | (2006.01) | |
| *H01Q 1/42* | (2006.01) | |
| *H01Q 1/32* | (2006.01) | |

(52) U.S. Cl.
CPC ............ *G01S 13/931* (2013.01); *B60R 11/00* (2013.01); *G01S 7/4004* (2013.01); *H01Q 1/32* (2013.01); *H01Q 1/42* (2013.01); *B60R 2011/0042* (2013.01); *G01S 2013/9327* (2020.01)

(58) Field of Classification Search
CPC .......... G01S 13/931; H01Q 1/32; H01Q 1/42; H01Q 1/422
See application file for complete search history.

(56) References Cited

U.S. PATENT DOCUMENTS

| | | | | |
|---|---|---|---|---|
| 3,794,997 A | * | 2/1974 | Iwatsuki | B60R 21/013 342/72 |
| 5,689,276 A | * | 11/1997 | Uematsu | H01Q 1/3275 343/713 |
| 6,111,551 A | * | 8/2000 | Schmidt | H01Q 1/42 156/254 |
| 6,496,138 B1 | * | 12/2002 | Honma | H01Q 1/42 342/70 |
| 6,674,412 B1 | * | 1/2004 | Schmidt | H01Q 25/00 343/872 |
| 6,937,184 B2 | * | 8/2005 | Fujieda | G01S 7/03 342/1 |
| 7,126,525 B2 | * | 10/2006 | Suzuki | H01Q 1/42 342/70 |
| 7,142,151 B2 | * | 11/2006 | Suzuki | G01S 7/023 342/70 |
| 7,408,500 B2 | * | 8/2008 | Shinoda | H01Q 1/3233 342/1 |

(Continued)

*Primary Examiner* — Peter M Bythrow
(74) *Attorney, Agent, or Firm* — Ladas & Parry, LLP

(57) ABSTRACT

Provided is a vehicle radar. According to an embodiment, the vehicle radar includes: a housing including an inner space therein; a board disposed within the housing and configured to generate a radar emission signal; a radome configured to transmit a radar emission signal generated from the board and coupled to the housing so as to protect the board; and a shield plate configured to block or absorb some or all of electromagnetic waves generated from the board. A portion of a lower surface of the radome includes an inner recess, and the shield plate is coupled to the recess.

15 Claims, 13 Drawing Sheets

(56) References Cited

U.S. PATENT DOCUMENTS

| | | | |
|---|---|---|---|
| 7,429,958 B2* | 9/2008 | Lindackers | H01Q 1/1214 343/713 |
| 8,149,157 B2* | 4/2012 | Takeuchi | G01S 7/03 342/70 |
| 8,368,587 B2* | 2/2013 | Takeuchi | H01Q 19/062 342/70 |
| 9,673,517 B2* | 6/2017 | Tran | H01Q 1/3233 |
| 9,956,993 B1* | 5/2018 | Klop | G01S 13/931 |
| 10,073,178 B2* | 9/2018 | Hara | G01S 7/4813 |
| 10,144,424 B2* | 12/2018 | Hara | G01S 17/931 |
| 10,186,748 B2* | 1/2019 | Fleancu | H01Q 1/02 |
| 2001/0026237 A1* | 10/2001 | Okai | H04L 27/26265 342/70 |
| 2004/0036645 A1* | 2/2004 | Fujieda | G01S 7/032 342/70 |
| 2004/0227663 A1* | 11/2004 | Suzuki | H01Q 17/001 342/70 |
| 2005/0057904 A1* | 3/2005 | Nakabuchi | H01Q 1/42 361/724 |
| 2005/0068236 A1* | 3/2005 | Noro | H01Q 1/3291 343/713 |
| 2005/0174280 A1* | 8/2005 | Suzuki | G01S 7/032 342/70 |
| 2006/0250311 A1* | 11/2006 | Bishop | H01Q 21/28 343/702 |
| 2007/0182649 A1* | 8/2007 | Kondou | H01Q 1/42 343/713 |
| 2007/0229374 A1* | 10/2007 | Shimura | H01Q 1/42 343/713 |
| 2007/0241962 A1* | 10/2007 | Shinoda | H01Q 1/3233 342/361 |
| 2010/0090923 A1* | 4/2010 | Sato | H01Q 1/3275 343/872 |
| 2010/0321230 A1* | 12/2010 | Takeuchi | H01Q 19/062 342/70 |
| 2010/0328179 A1* | 12/2010 | Takisawa | H01Q 1/42 343/841 |
| 2011/0234468 A1* | 9/2011 | Omuro | H01Q 1/40 343/840 |
| 2014/0218255 A1* | 8/2014 | Sanford | H01Q 19/134 343/837 |
| 2015/0123872 A1* | 5/2015 | Fujita | G01S 7/03 343/872 |
| 2015/0331087 A1* | 11/2015 | Philipp | G01S 7/02 342/175 |
| 2015/0349414 A1* | 12/2015 | Tagi | G01S 7/03 343/872 |
| 2016/0023624 A1* | 1/2016 | Schaaf | B60R 19/03 293/117 |
| 2016/0033621 A1* | 2/2016 | Ottenhues | G01S 7/032 342/175 |
| 2016/0137230 A1* | 5/2016 | Taneda | G01S 13/931 296/193.09 |
| 2016/0192518 A1* | 6/2016 | Watanabe | G01S 7/02 361/807 |
| 2016/0218420 A1* | 7/2016 | Leung | H01Q 21/065 |
| 2016/0268693 A1* | 9/2016 | Ding | G01S 13/931 |
| 2016/0315376 A1* | 10/2016 | Motomura | H01Q 1/3275 |
| 2017/0077587 A1* | 3/2017 | Fleancu | H01Q 1/02 |
| 2017/0237158 A1* | 8/2017 | Gibson | H01Q 1/38 343/872 |
| 2017/0307724 A1* | 10/2017 | Park | G01S 13/931 |
| 2018/0053992 A1* | 2/2018 | Mizutani | H01Q 1/22 |
| 2018/0203110 A1* | 7/2018 | Watanabe | G01S 7/03 |
| 2018/0290612 A1* | 10/2018 | Ikeno | B60R 19/023 |
| 2018/0332742 A1* | 11/2018 | Yamagata | H05K 9/0094 |
| 2019/0153770 A1* | 5/2019 | Mitchell | G01S 13/56 |
| 2019/0161041 A1* | 5/2019 | Fernandez | G01S 7/02 |
| 2019/0198986 A1* | 6/2019 | Singh | H01Q 1/3233 |

\* cited by examiner

VEHICLE RADAR

CROSS REFERENCE TO RELATED APPLICATION

This application claims priority to Korean Patent Application No. 10-2018-0003175, filed on Jan. 10, 2018, which is hereby incorporated by reference for all purposes as if fully set forth herein.

BACKGROUND OF THE INVENTION

1. Field of the Invention

Some embodiments of the present disclosure generally relate to a vehicle radar, and more particularly to a vehicle radar which is capable of increasing the efficiency of an assembly process and reducing a defect rate during the assembly process.

2. Description of the Prior Art

A radar emission signal radiated from a vehicle radar is affected by electromagnetic waves radiated from an electronic device included in the vehicle radar. Accordingly, the vehicle radar includes a shield plate for absorbing or blocking electromagnetic waves, so that the radar emission signal can be prevented from being affected by electromagnetic waves.

SUMMARY OF THE INVENTION

The present disclosure provides a vehicle radar having a structure capable of reducing the number of steps, a process time, and a defect rate.

Further, the present disclosure provides a vehicle radar in which a radome and a shield plate are integrally coupled.

A vehicle radar according to an embodiment of the present disclosure includes: a housing including an inner space therein; a board disposed within the housing so as to mount an antenna thereon; a radome configured to transmit a radar emission signal generated from the board and coupled to the housing so as to protect the board; and a shield plate configured to block or absorb some or all of electromagnetic waves generated from the board. A portion of a lower surface of the radome includes an inner recess, and the shield plate is coupled to the recess.

In the vehicle radar according to the present disclosure, the radome and the shield plate can be handled as one component in an assembly process, and thus it is possible to reduce the number of assembly steps and to shorten the process time.

Further, according to the present disclosure, it is possible to omit separate steps for assembling the radome and the shield plate, and to fundamentally block defects that may occur during the steps for assembling the radome and the shield plate.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
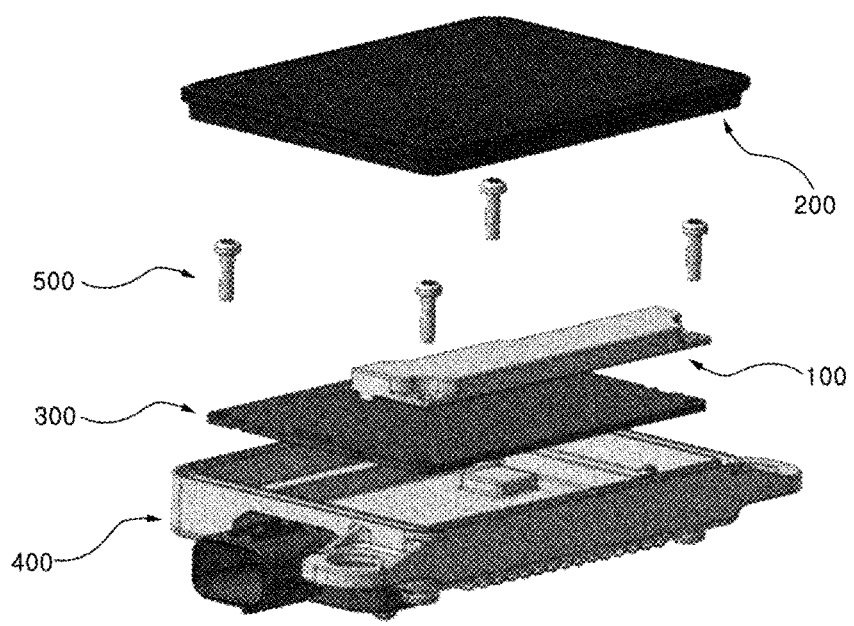
FIG. 1 illustrates the components of a vehicle radar apparatus according to the prior art.

Hereinafter, aspects of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 illustrates the independent components of a vehicle radar apparatus according to the prior art. Referring to FIG. 1, a shield plate 100 exists as an independent component, which is distinguished from other components of a vehicle radar such as a radome 200, a PCB 300 on which a plurality of electronic devices are mounted, and a housing 400. A number of components, including the shield plate 100, are coupled with other components through processes such as fastening by screws 500 and press-fitting.

Because the shield plate 100 is handled as an independent component in an assembly process, the number of steps increases and the complexity (process time) of the process is high in the process of manufacturing the vehicle radar. Meanwhile, because the number of steps increases and the complexity of the process is high, there is a high probability that defects will occur in the process.

Figure 2A:
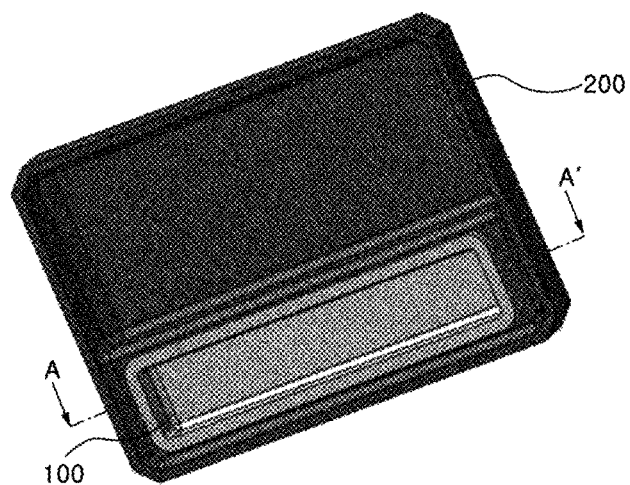
FIGS. 2A to 2C illustrate a structure in which a radome and a shield plate are integrally formed according to an embodiment, and a method of forming the same.
Figure 2B:
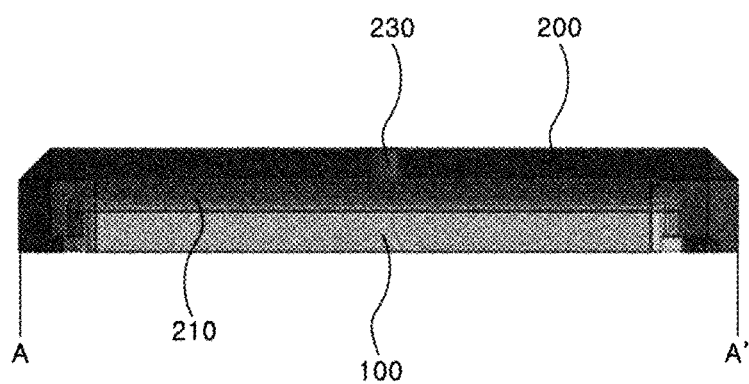
Figure 2C:
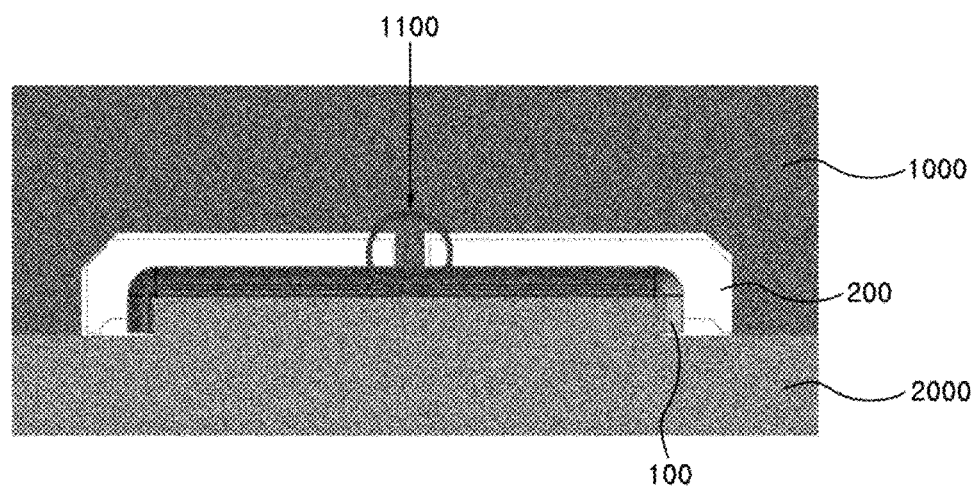

In order to solve these problems, a vehicle radar according to embodiments of the present disclosure includes a radome and a shield palette, which are integrally formed. In the present disclosure, the types of components included in the vehicle radar are the same as or similar to the types of components of the vehicle radar according to the prior art disclosed with reference to FIG. 1, except that the radome and the shield plate are integrally formed. Accordingly, with reference to FIG. 1, a vehicle radar according to an embodiment of the present disclosure will be described focusing on the structures of a radome and a shield plate. FIGS. 2A to 2C illustrate a radome and a shield plate, which are integrally formed according to an embodiment. Specifically, FIG. 2A is a perspective view of a structure in which a radome and a shield plate are coupled, FIG. 2B is a cross-sectional view taken along a cut line A-A' in FIG. 2A, and FIG. 2C illustrates a method of forming the structure of FIG. 2A.

Referring to FIGS. 2A and 2B, a shield plate 100 configured to block or absorb electromagnetic waves is coupled to a radome 200. The shield plate may include a metallic material capable of blocking some or all of electromagnetic waves. Alternatively, the shield plate may include a plastic material capable of absorbing some or all of electromagnetic waves. The lower surface of the radome 200 may include a recess 210 for accommodating the shield plate therein. At this time, the size and shape of the recess 210 correspond to the size and shape of the shield plate 100, so that the shield plate 100 can be coupled in a manner of being fitted into the recess 210 in the radome 200.

FIG. 2C illustrates a method in which the radome 200 and the shield plate 100 are integrally formed according to the present embodiment. Referring to FIG. 2C, when molding the radome 200, an injection-molding operation is performed in the state in which the shield plate 100 is positioned between an upper mold part 1000 and a lower mold part 2000, thereby forming a structure in which the shield plate 100 is integrally coupled to the radome 200. At this time, the upper mold part 1000 may include a protrusion 1100 protruding toward the lower mold part 2000 for the purpose of fixing the shield plate 100. Accordingly, the radome 200 may include the through-hole 230 at a position corresponding to the position of the protrusion 1100 of the upper mold part 1000. Referring to FIG. 2B, the radome 200 includes the through hole 230 in the recess 210, and the position of the through hole 230 corresponds to the position of the protrusion 1100 of the upper mold part 1000.

Since the radome 200 and the silt plate 100 have an integrally formed structure, the efficiency of an assembly process of a vehicle radar apparatus can be improved. That is, no separate step for coupling the radome 200 and the shield plate 100 to each other is required in the assembly process of the vehicle radar, thereby reducing the number of steps and shortening the process time. In addition, there is an advantage in that the possibility of a defect occurring during the assembly of the radome 200 and the shield plate 100 can be fundamentally blocked.

Figure 3A:
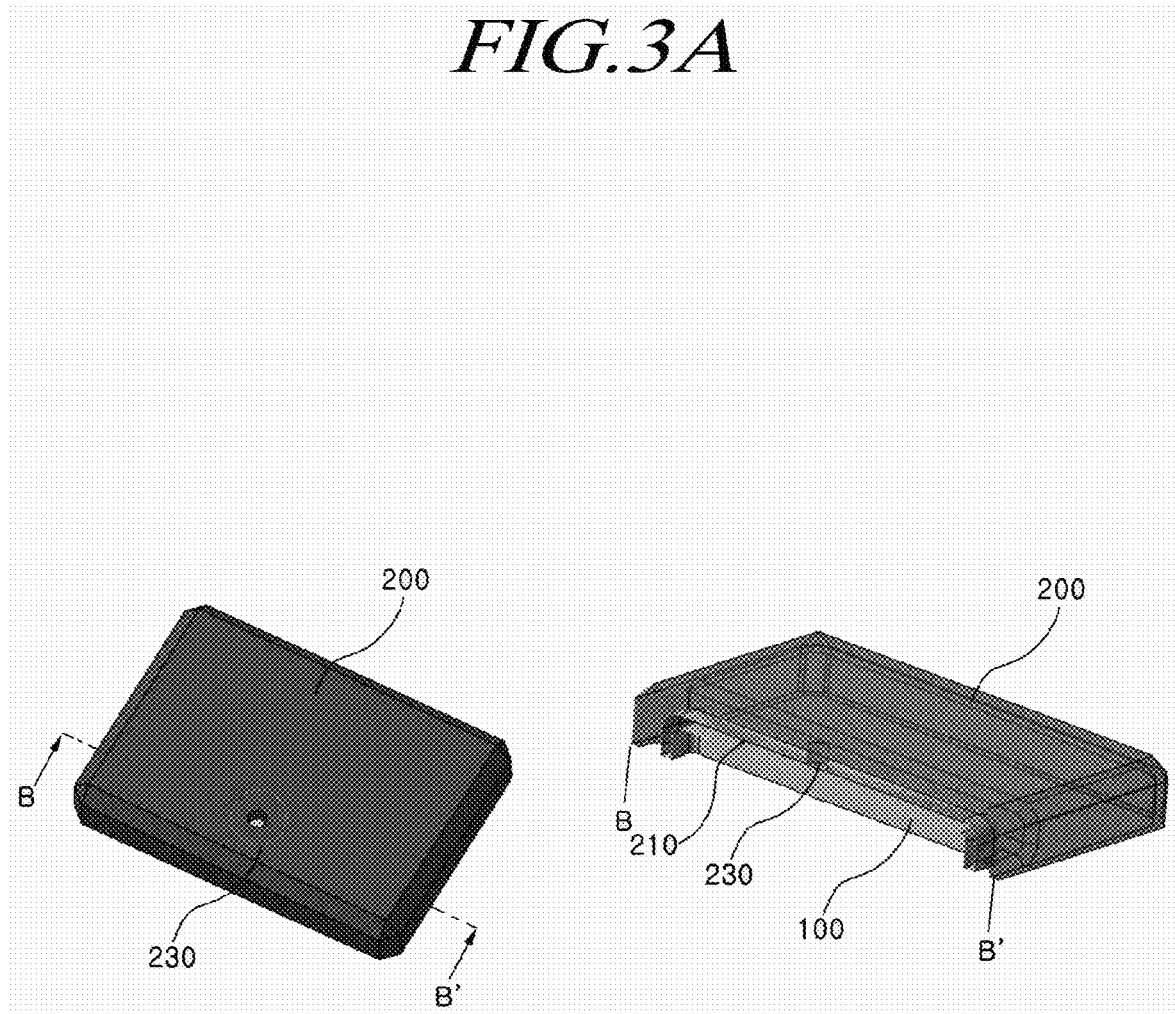
FIGS. 3A and 3B illustrate the structure in which the radome and the shield plate are integrally formed according to the embodiment of FIGS. 2A to 2C, in the state in which the structure is further provided with a sealing member for preventing leakage.
Figure 3B:

FIGS. 3A and 3B illustrate the structure in which the radome and the shield plate are integrally formed according to the embodiment of FIGS. 2A to 2C, in the state in which the structure is further provided with a sealing member for preventing leakage.

As mentioned above, the radome 200 has a through hole 230 in the recess 210. Referring to a perspective view and a cross-sectional view taken along line B-B' of the perspective view in FIG. 3A, an interface at which the radome 200 and the shield plate 100 are in contact with each other may be exposed through the through hole 230. There is therefore a risk of leakage occurring through the through hole 230. Moisture, foreign matter, and the like may infiltrate to the interface between the radome 200 and the shield plate 100 through the through hole 230, which may cause malfunction of the vehicle radar.

Referring to FIG. 3B, a sealing member 250 is formed in the through hole 230 in order to block foreign matter such as moisture. The sealing member 250 may include a material such as resin or epoxy. The upper surface of the sealing member 250 may be flush with the upper surface of the radome 200.

Figure 4A:
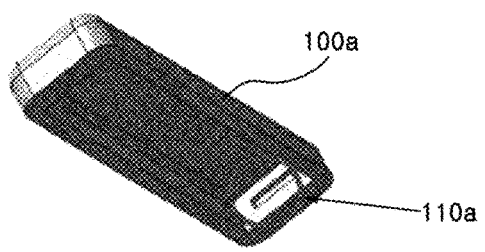
FIGS. 4A and 4B illustrate the structure of a shield plate according to another embodiment and a method of integrally forming a radome and the shield plate.
Figure 4B:
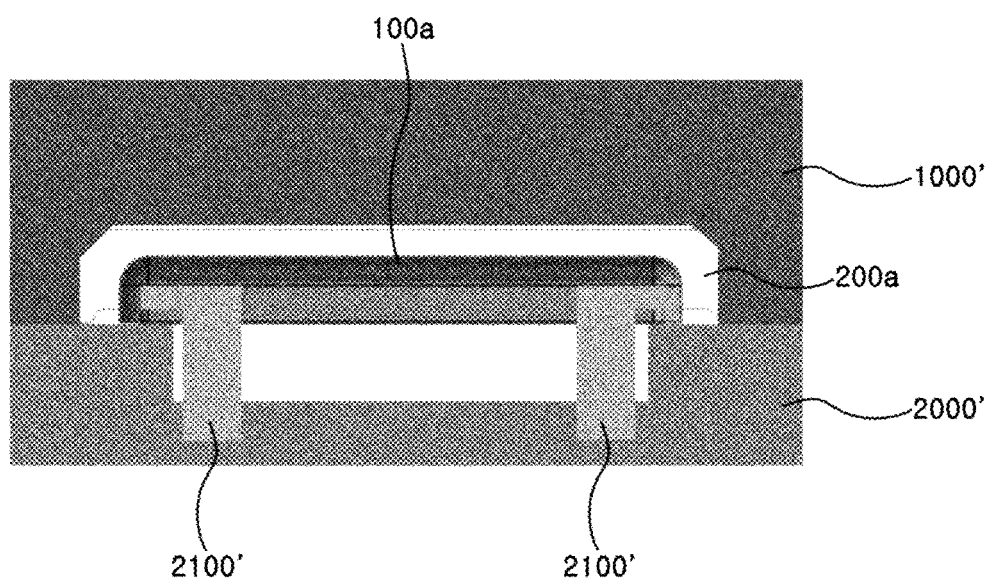

FIGS. 4A and 4B illustrate the structure of a shield plate according to another embodiment and a method of integrally forming a radome and the shield plate. Specifically, FIG. 4A illustrates a structure of a shield plate according to another embodiment, and FIG. 4B illustrates a method of forming an integral structure with a radome using the shield plate illustrated in FIG. 4A.

Referring to FIG. 4A, the shield plate 100a has a structure including sidewalls and an upper surface, and the sidewalls have at least one inner depression 110a. The at least one inner depression 110a may be formed in, for example, opposite sidewalls. The at least one inner depression 110a may be used for fixing the shield plate 100a in the process of forming the integral structure with the radome 200a. For example, referring to FIG. 4B, the shield plate 100a is positioned in an upper mold part 1000' and a lower mold part 2000' in the process of injection molding of the radome 200a. At this time, the lower mold lower part 2000' includes a fixing portion 2100' that can be fastened to the at least one inner depression 110a in the shield plate 100a, and when the fixing portion 2100' is fastened to the inner depression 100a, the shield plate 100a can be fixed in the mold.

Figure 5A:
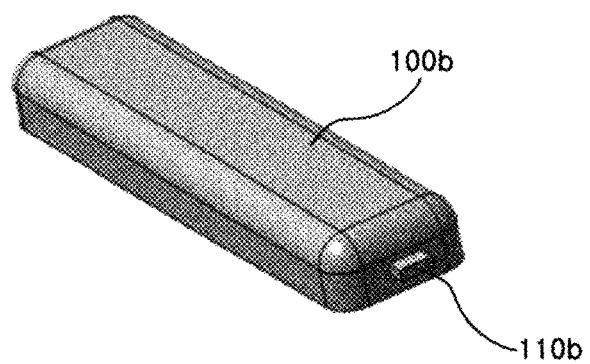
FIGS. 5A and 5B illustrate the structures of shield plates according to another embodiment.
Figure 5B:
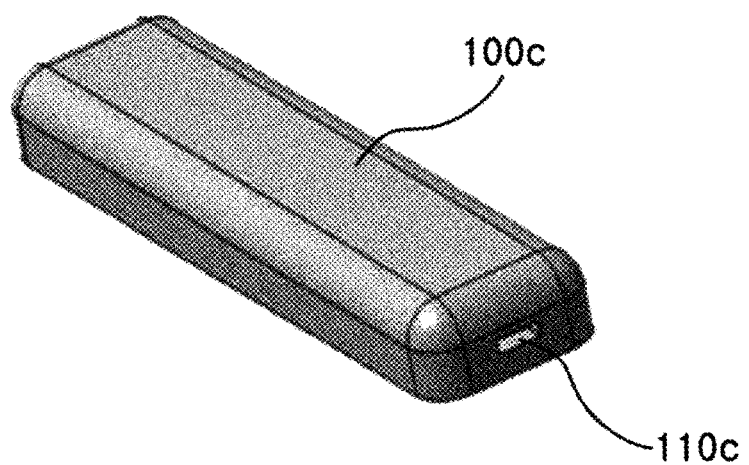

FIGS. 5A and 5B illustrate the structures of shield plates according to another embodiment. The shield plates according to the present embodiment are also intended to form an integral structure with the radome.

Referring to FIG. 5A, the side surfaces of the shield plate 100b include at least one protrusion 110b. Due to the protrusion 110b, the inner surface of the recess in the radome has therein a depression. That is, in correspondence with the position where the protrusion 110b is located, a depression is formed in the inner surface of the recess of the radome in the injection-molding process for molding the radome. As a result, the shield plate 110b can be more firmly fixed to the radome.

Referring to FIG. 5B, the side surfaces of the shield plate 100c include an outer depression 110c. Due to the outer depression 110c, the inner surface of the recess in the radome has a protrusion. That is, in correspondence with the position where the outer depression 110c is located, a protrusion is formed on the inner surface of the recess of the radome in the injection-molding process for molding the radome. As a result, the shield plate can be more firmly fixed to the radome.

Figure 6A:
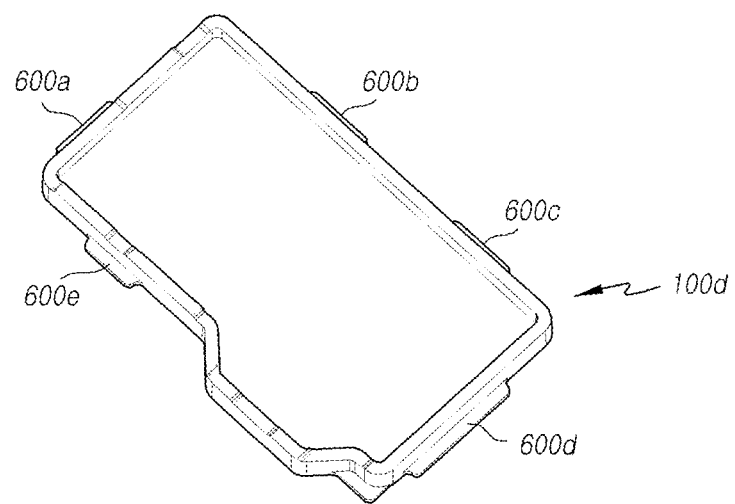
FIGS. 6A and 6B illustrate the structure of a shield plate according to another embodiment.
Figure 6B:
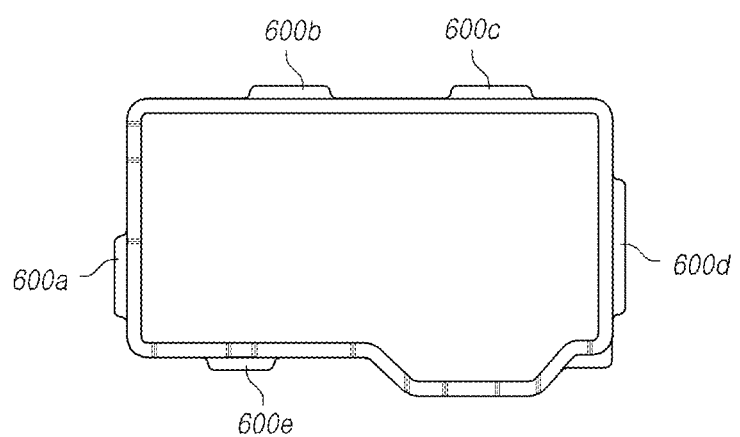

FIGS. 6A and 6B illustrate the structure of a shield plate according to another embodiment.

FIG. 6A is a perspective view of a shield plate according to another embodiment, and FIG. 6B is a plan view of the shield plate according to another embodiment.

Referring to FIG. 6A, the shield plate 100d may be configured to include a plurality of protrusions 600a, 600b, 600c, 600d, and 600e. Due to the protrusions 600a, 600b, 600c, 600d, and 600e, the inner surface of the recess of the radome has depressions therein. That is, in correspondence with the positions where the protrusions 600a, 600b, 600c, 600d, and 600e are located, depressions are formed in the inner surface of the recess of the radome in the injection-molding process for molding the radome. As a result, the shield plate 110d can be more firmly fixed to the radome.

The protrusions 600a, 600b, 600c, 600d, and 600e may be formed on respective sidewalls of the shield plate 100d, and the number of protrusions 600a, 600b, 600c, 600d, and 600e may be determined depending on the length of the sidewalls.

Alternatively, at least one of the protrusions 600a, 600b, 600c, 600d, or 600e may be formed on each sidewall of the shield plate 100d.

Referring to FIG. 6B, the shield plate 100d has five protrusions 600a, 600b, 600c, 600d, and 600e. Each of the protrusions 600a, 600b, 600c, 600d, and 600e may be formed to protrude outwards on the sidewalls of the shield plate 100d. The shield plate 100d can be more firmly coupled to the radome by the protrusions 600a, 600b, 600c, 600d, and 600e during the injection-molding process.

Figure 7:
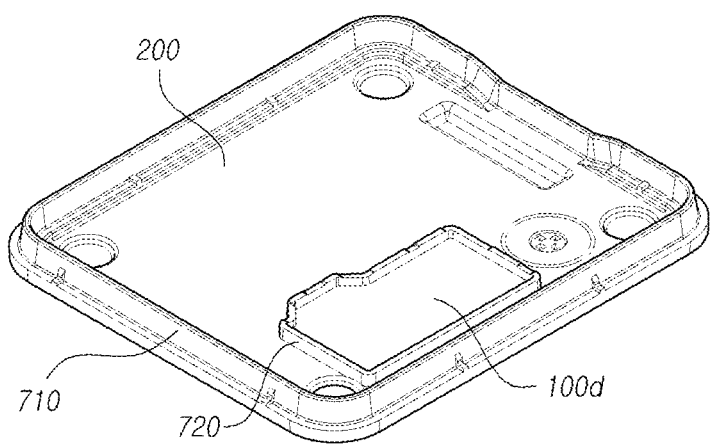
FIG. 7 illustrates a structure in which the shield plate of FIG. 6 is integrally coupled with the radome.

FIG. 7 illustrates a structure in which the shield plate of FIG. 6 is integrally coupled with the radome.

Referring to FIG. 7, the height of the sidewalls 720 of the shield plate 100d may be smaller than the height of the sidewalls 710 of the radome 200 in the state in which the shield plate 100d and the radome 200 are coupled to each other. That is, the length of the sidewalls 710 of the radome 200 may be greater than the length of the sidewalls 720 of the shield plate 100d, which is measured with reference to the lower surface of the radome 200.

Through this, the shield plate 100d may be configured to be vertically spaced apart from a board 300. That is, the shield plate 100d and the board 300 may not be in contact with each other, which is able to prevent an electronic device, an RF chip, a LO line, an antenna patch, and the like on the board from being damaged.

The difference in sidewall height between the shield plate and the radome described above is equally applicable to the embodiments described with reference to FIGS. 2 to 5.

Meanwhile, the shield plate and the radome are coupled with each other using protrusions or depressions, but the protrusions or depressions are not formed through a separate assembly process, but are molded through the injection-molding process.

The shield plate described above may be made of a metallic material for blocking electromagnetic waves.

Alternatively, the shield plate may be made of a plastic material to absorb electromagnetic waves.

For example, the shield plate may be made of a polyester-based crystalline thermoplastic plastic material. Alternatively, the shield plate may include a polybutylene terephthalate (PBT) material. Alternatively, the shield plate may include a carbon fiber material.

More specifically, the shield plate may be made of, for example, a carbon fiber-reinforced plastic material. Preferably, the shield plate may be made of a carbon fiber-reinforced plastic material made by mixing a PBT (polybutylene terephthalate) material with 40% carbon fiber (PBT-CF40).

Specific execution modes described herein are represented as embodiments of the present disclosure, and are not intended to limit the scope of the present disclosure in any way. For brevity of description, descriptions of conventional circuit configurations, control systems, software, and other functional aspects of such systems may be omitted. In addition, the connections or connection members of the lines between the components illustrated in the figures are illustrative of functional connections and/or physical or circuit connections, which may be replaced or additionally provided by a variety of functional connections or circuit connections. When there is no specific wording such as "essentially" or "critically" with respect to a component, the component may not be a necessary component for application of the present disclosure.

In the specification of the present disclosure (particularly in the claims), the use of the terms such as "the above-described" and similar indication words may refer to both singular and plural terms. In addition, in the present disclosure, when a range is described, the present disclosure includes an embodiment to which an individual value belonging to the above range is applied (unless there is contradiction thereto), which is the same as the case in which each individual value constituting the above range is described in the detailed description. The use of all examples or exemplary terms (e.g., etc.) in the present disclosure is merely used in order to describe the present disclosure in detail, and the scope of the present disclosure is not limited by the examples of illustrative terms unless otherwise defined in the claims. It will also be appreciated by a person ordinarily skilled in the art that various modifications, combinations, and changes can be made depending on design criteria and factors within the scope of the appended claims or equivalents thereof.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

The above embodiments have been described merely for the purpose of illustrating the technical idea of the present disclosure, and those skilled in the art will appreciate that various modifications and changes are possible without departing from the scope and spirit of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed based on the accompanying claims in such a manner that all of the technical ideas included within the scope equivalent to the claims belong to the present disclosure.

What is claimed is:

1. A vehicle radar comprising:
   a housing having an inner space therein;
   a board disposed within the housing so as to mount an antenna thereon;
   a radome configured to transmit a radar emission signal generated from the board and coupled to the housing so as to protect the board; and
   a shield plate configured to block or absorb some or all of electromagnetic waves generated from the board,
   wherein a portion of a surface of the radome comprises an inner recess, and the shield plate is disposed inside the inner recess of the radome, and the radome and the shield plate are molded by a molding structure so that the molding structure surrounds the radome and the shield plate.

2. The vehicle antenna device of claim 1, wherein a shape and size of the recess correspond to a shape and size of the shield plate.

3. The vehicle antenna device of claim 1, wherein the radome comprises a through hole in the recess.

4. The vehicle antenna device of claim 3, further comprising:
   a sealing member configured to seal the through hole in a state in which the shield plate is coupled to the recess in the radome.

5. The vehicle antenna device of claim 1, wherein sidewalls of the shield plate comprise at least one protrusion.

6. The vehicle antenna device of claim 5, wherein each of the sidewalls of the shield plate comprises at least one protrusion.

7. The vehicle antenna device of claim 1, wherein a height of the sidewalls of the shield plate is smaller than a height of the sidewalls of the radome in a state in which the shield plate and the radome are coupled to each other.

8. The vehicle antenna device of claim 1, wherein the shield plate and the board are vertically spaced apart from each other.

9. The vehicle antenna device of claim 1, wherein the shield plate and the radome are integrally injection-molded.

10. The vehicle antenna device of claim 1, wherein the sidewalls of the shield plate comprise at least one outer depression.

11. The vehicle antenna device of claim 1, wherein the sidewalls of the shield plate comprise at least one inner depression.

12. The vehicle antenna device of claim 1, wherein the shield plate comprises a metallic material capable of blocking some or all of electromagnetic waves generated from the board.

13. The vehicle antenna device of claim 1, wherein the shield plate comprises a plastic material capable of absorbing some or all of electromagnetic waves generated from the board.

14. The vehicle antenna device of claim 1, wherein the radome comprises a through hole positioned in the recess, and a part of the molding structure surrounding the radome and the shield plate is disposed in the through hole positioned in the recess of the radome.

15. The vehicle antenna device of claim 1, wherein the radome and the shield plate surrounded by the molding structure directly contact each other.

* * * * *